United States Patent [19]
Ryang

[11] Patent Number: 5,712,331
[45] Date of Patent: Jan. 27, 1998

[54] CURABLE EPOXY COMPOSITIONS CONTAINING AZIRIDINE IN SUPERCRITICAL FLUID CARBON DIOXIDE

[75] Inventor: Hong-Son Ryang, Camarillo, Calif.

[73] Assignee: Rockwell International Corporation, Costa Mesa, Calif.

[21] Appl. No.: 515,440

[22] Filed: Aug. 15, 1995

[51] Int. Cl.$^6$ ............................ C08K 3/00; C08K 63/00; C08G 59/50; C08G 59/56

[52] U.S. Cl. .................. 523/400; 523/429; 525/526; 528/116; 528/319; 528/411; 528/412; 528/416; 528/312; 528/315; 528/408

[58] Field of Search .................. 528/92, 319, 116, 528/411, 412, 416, 55, 56, 73, 91, 93, 88, 48, 312, 315, 408; 525/526; 524/424; 523/400, 429

[56] References Cited

U.S. PATENT DOCUMENTS

| | | | |
|---|---|---|---|
| Re. 29,586 | 3/1978 | Merlino et al. | 528/109 |
| 2,901,443 | 8/1959 | Starck et al. | 528/116 |
| 3,296,200 | 1/1967 | Sommerville et al. | 528/116 |
| 3,502,618 | 3/1970 | Uelzmann et al. | 528/109 |
| 3,576,786 | 4/1971 | Kalfayan et al. | 528/116 |
| 3,763,100 | 10/1973 | Martin et al. | 260/47 EN |
| 4,070,354 | 1/1978 | Dick et al. | 260/239 |
| 4,322,513 | 3/1982 | Wada et al. | 528/92 |
| 4,656,217 | 4/1987 | Sugiura et al. | 524/430 |
| 5,017,675 | 5/1991 | Marten et al. | 528/111 |
| 5,106,650 | 4/1992 | Hoy et al. | 427/27 |
| 5,128,431 | 7/1992 | Riding et al. | 528/15 |
| 5,241,001 | 8/1993 | Kania et al. | 525/111 |
| 5,247,044 | 9/1993 | Crivello et al. | 528/15 |

OTHER PUBLICATIONS

Crivello et al., "Novel Platinum-Containing Initiators for Ring-Opening Polymerizations," Journal of Polymer Science: Part A: Polymer Chemistry, vol. 29, pp. 1853–1853 (1991).

Crivello et al., "Regioselective Rhodium-Containing Catalysts for Ring-Opening Polymerizations and Hydrosilylations," Journal of Polymer Science: Part A: Polymer Chemistry, vol. 30, pp. 1–11 (1992).

Crivello et al., "Catalysis of Ring-Opening and Vinyl Polymerizations by Dicobaltoctacarbonyl," Journal of Polymer Science: Part A: Polymer Chemistry, vol. 30, pp. 31–39 (1992).

*Primary Examiner*—Donald R. Wilson

[57] ABSTRACT

A curable resin system in supercritical carbon dioxide as diluent includes an epoxy resin, a co-reactant selected from poly N-substituted aziridines, and a catalyst to promote cure at ambient temperature. The system is compatible with various epoxy resins such as bisphenol A epoxy, bisphenol F epoxy, novolac epoxy, cycloaliphatic epoxy, triglycidylaminophenol, and triglycidyl isocyanurate. The aziridine co-reactant may be selected from reaction products of NH aziridines with acrylates and methacrylates of trimethylolpropane, ethylene glycol, propylene glycol, bisphenol A, bisphenol F, pentaerythritol, glycerol, and their alkoxylated derivatives; reaction products of NH aziridines with epoxy compounds; and 1-aziridine ethanol and its reaction products with epoxy and isocyanate functional compounds. Suitable catalysts include acid salts and complexes, strong electron accepting compounds, combinations of silicon hydrides and metal complexes, and non-halogen containing boron derivatives. As an option, compounds having active hydrogen, such as mono or multifunctional phenols, alcohols, and carboxylic acids, with or without anhydrides, may be added. The curable resin system provides controlled cure rates at ambient temperature, compatibility with SCF $CO_2$ spray application systems, and no release of volatile organic compounds during cure.

11 Claims, No Drawings

CURABLE EPOXY COMPOSITIONS CONTAINING AZIRIDINE IN SUPERCRITICAL FLUID CARBON DIOXIDE

TECHNICAL FIELD

The present invention relates to curable epoxy resin systems and, in particular, to epoxy compositions that contain aziridine and a catalyst to promote curing at ambient temperature.

BACKGROUND OF THE INVENTION

Certain high performance resin systems, including epoxies and urethanes, are known to be curable at ambient temperatures using aliphatic amines that have active amine hydrogen (NH). These resin systems can be difficult to process, however, because the aliphatic amines used as curing agents (or co-reactants) can cause skin irritation and can initiate fast reactions that are difficult to control. As alternatives to aliphatic amines, and in applications requiring longer lives for the resins and curing agents, blocked amines, such as ketimines and enamines, which are activated by exposure to moisture, can be used as curing agents. The use of blocked amines creates other problems, however, including dependency of the cure rate on humidity, generation of environmentally undesirable volatile organic byproducts, and ability to achieve only limited coating thickness.

Protective coatings, including enamels, varnishes, polyurethanes, and lacquers, have generally required organic solvents to reduce their viscosity for spray applicators. Spray processes, however, have become subject to increasing regulation because of the adverse environmental impact of volatile organic compounds (VOCs). Attempts to reduce the use of VOCs in spray coatings have included development of high solids coatings, water-based coatings, powder coatings, nonaqueous dispersions, and supercritical fluid (SCF) carbon dioxide ($CO_2$) application systems. At the present time, none of the foregoing technologies has been able to fully eliminate VOCs while still providing high performance coatings. In particular, amine/epoxy systems used for conventional coatings are generally not compatible with SCF $CO_2$ processes. Conventional amines with active NH have high reactivity with carbon dioxide and tend to form amine carbamates that reversibly release $CO_2$. This can cause undesirable as results such as formation of crystals, voids, and nonuniform coatings.

As background, supercritical $CO_2$ processes are described in U.S. Pat. No. 5,106,650 issued to Hoy et al., the teachings of which are incorporated herein by reference. SCF $CO_2$ systems are advantageous because the highly volatile primary diluents needed in alternative spray processes are replaced with environmentally benign carbon dioxide. In addition, SCF $CO_2$ processes generally require only minor modifications to conventional spray equipment, can provide high atomization with excellent spray control, and can be used with high performance resin systems.

Because of environmental regulations and limitations of prior art resin systems, there is a need for an epoxy resin system that is curable at ambient temperature, does not generate volatile organic compounds, and is compatible with SCF $CO_2$ spray application systems.

SUMMARY OF THE INVENTION

The present invention is a curable resin system (composition) that includes an epoxy resin, an N-substituted aziridine as a co-reactant, and a catalyst (also called an accelerator) to promote cure at ambient temperature. As an option to further promote cure, the resin system may include compounds having active hydrogen, such as mono or multifunctional phenols, alcohols, and carboxylic acids, with or without anhydrides. The present resin system provides controlled cure rates at ambient temperature and no release of volatile organic compounds during cure.

Epoxy resins compatible with the present system include, for example, bisphenol A epoxy, bisphenol F epoxy, novolac epoxy, cycloaliphatic epoxy, triglycidyl aminophenol, and triglycidyl isocyanurate. The co-reactant is selected from N-substituted aziridines. Examples of suitable multifunctional N-substituted aziridines include (i) reaction products of an NH aziridine (such as ethylene imine or propylene imine, for example) with acrylates or methacrylates of trimethylolpropane, ethylene glycol, propylene glycol, bisphenol A, bisphenol F, pentaerythritol, glycerol, and their alkoxylated derivatives (such as trimethylol propane triacrylates, ethylene glycol diacrylate, bisphenol A diacrylate, bisphenol A ethoxylate diacrylate, and pentaerythritol triacrylate, for example); (ii) reaction products of an NH aziridine with epoxy compounds (such as bisphenol A epoxy, and bisphenol F epoxy, for example); and (iii) 1-aziridine ethanol and its reaction products with epoxy compounds and isocyanate functional compounds (such as toluene diisocyanate, 1,6-hexamethylene diisocyanate, isophorone diisocyanate, and bis-4-isocyanatocyclohexyl methane, for example).

The present epoxy resin system, which uses an N-substituted aziridine co-reactant, requires a catalyst to initiate and/or accelerate the cure process. Examples of suitable catalysts include (i) salts and complexes of acids, such as $BF_3$-amine complexes, p-toluene sulfonic acid metal salts (as of copper and zinc, for example), cetyltrimethylammonium p-toluene sulfonate, 1-dodecylpyridinium p-toluene sulfonate, tetraethylamine trifluoro-sulfonate, and ferrocenesulfonic acid ammonium salt; (ii) strong electron accepting compounds such as tetracyanobenzene and tetrachlorobenzoquinone, for example; (iii) combinations of a silicon hydride (such as phenylsilane, diphenylsilane, and butylsilane, for example) and a metal complex (such as complexes of Al, Fe, Pt, Pd, Rh, Ru, Ti, and Zr, including aluminum acetylacetonate, aluminum trifluoroacetylacetate, 8-hydroxyquinolinol aluminum complex, aluminum isopropoxide, aluminum tri-tert-butoxide, aluminum tri-sec-butoxide, acetoalkoxy aluminum diisopropylate, (1-acetylcyclopentadienyl)cyclopentadienyl iron, chloroplatinic acid, platinum dibenzonitrile dichloride, platinum acetylacetonate, tetramethyl-tetravinyl cyclotetrasiloxane platinum complex, palladium acetate, palladium acetylacetonate, cyclopentadienylruthenium, titanium isopropoxide, and zirconium n-propoxide, for example); and (iv) non-halogen containing boron derivatives, such as boric acid and alkyl borates (such as triisopropyl borate and tri-tert-butyl borate, for example).

A principal object of the invention is an epoxy resin system that is curable at ambient temperature and does not release volatile organic compounds. A feature of the invention is the use of an N-substituted aziridine co-reactant and a suitable catalyst in an epoxy resin system. An advantage of the invention is an epoxy resin system that is compatible with SCF $CO_2$ spray application systems.

DETAILED DESCRIPTION OF THE PREFERRED EMBODIMENTS

The present invention comprises an epoxy resin system (i.e., a composition) that is curable at room temperature, does not generate volatile organic compounds, and is compatible with SCF $CO_2$ spray application systems. The system includes an epoxy resin, an N-substitiuted aziridine as a co-reactant, and a catalyst (accelerator) to promote cure at ambient temperature (typically at room temperature, with faster cure at elevated temperature, if desired). As an option to further promote cure, the system may include compounds having active so hydrogen, such as mono or multifunctional phenols, alcohols, and carboxylic acids, with or without anhydrides.

The curable resin system of the present invention is compatible with various commonly known epoxy resins such as bisphenol A epoxy, bisphenol F epoxy, novolac epoxy, cycloaliphatic epoxy, triglycidyl-aminophenol, and triglycidyl isocyanurate, for example. Other suitable epoxy resins are described in U.S. Pat. No. 5,017,675 issued to Marten et al., the teachings of which are hereby incorporated by reference.

The co-reactant in the present epoxy resin system is selected from N-substituted aziridines. Such multifunctional aziridines include, by way of example and not limitation, (i) reaction products of an NH aziridine (such as ethylene imine or propylene imine, for example) with acrylates or methacrylates of trimethylolpropane, ethylene glycol, propylene glycol, bisphenol A, bisphenol F, pentaerythritol, glycerol, and their alkoxylated derivatives (such as trimethylol propane triacrylates, ethylene glycol diacrylate, bisphenol A diacrylate, bisphenol A ethoxylate diacrylate, and pentaerythritol triacrylate, for example); (ii) reaction products of an NH aziridine with an epoxy compound (such as bisphenol A epoxy, and bisphenol F epoxy, for example); and (iii) 1-aziridine ethanol and its reaction products with epoxy compounds and isocyanate functional compounds (such as toluene diisocyanate, 1,6-hexamethylene diisocyanate, isophorone diisocyanate, and bis-4-isocyanatocyclohexyl methane, for example). As an option, compounds having active hydrogen, such as mono or multifunctional phenols, alcohols, and carboxylic acids, for example, may be added to assist the curing process. Cure can be further accelerated by using combinations of these active hydrogen compounds with anhydrides.

As further background, aziridine compounds are described in U.S. Pat. No. 4,656,217 issued to Sugiura et al., and the use of aziridines in epoxy resin systems is described in U.S. Pat. No. 5,241,001 issued to Kania et al. The teachings of these prior patents are hereby incorporated by reference. N-unsubstituted aziridines have active amine hydrogen (like conventional secondary amines) and are known to react with epoxies, isocyanates, and $CO_2$. However, the reactivity of N-substituted aziridines is substantially lower than conventional amine curing agents (which are described above). Alone, N-substituted aziridines do not react readily with epoxies, isocyanates, or $CO_2$ at ambient temperature because they lack active amine hydrogen. Therefore, catalysts (accelerators) are used with N-substituted aziridines to initiate and/or accelerate the cure process in the epoxy resin systems of the present invention.

Various catalysts are known to promote ring opening polymerization of heterocyclic compounds, such as ethylene imines, ethylene sulfides, and ethylene oxides, for example. Most of the commonly used catalysts, however, are not suitable for epoxy resin systems of the present invention because of the difference in reactivity between aziridines and epoxies. For example, when using conventional Lewis acid catalysts, aziridines react mostly with themselves, resulting in incomplete cure and/or non-uniform films.

Four classes of catalysts have been found to be suitable for the resin systems of the present invention. The first class of catalysts include salts and complexes of acids, typically strong Lewis acids and protonic acids, such as $BF_3$ and sulfonic acid, for example. Such acid salts and complexes include $BF_3$-amine complexes, p-toluene sulfonic acid metal salts (such as of copper and zinc, for example), cetyltrimethylammonium p-toluene sulfonate, 1-dodecylpyridinium p-toluene sulfonate, tetraethylamine trifluorosulfonate, and ferrocenesulfonic acid ammonium salt. The second class of catalysts includes strong electron accepting compounds (i.e., charge transfer acceptors), such as tetracyanobenzene and tetrachlorobenzoquinone, for example. The third class includes combinations of a silicon hydride (such as phenylsilane, diphenylsilane, and butylsilane, for example) and a metal complex (such as complexes of Al, Fe, Pt, Pd, Rh, Ru, Ti, and Zr, including aluminum acetylacetonate, aluminum trifluoroacetylacetate, 8-hydroxyquinolinol aluminum complex, aluminum isopropoxide, aluminum tri-tert-butoxide, aluminum tri-sec-butoxide, acetoalkoxy aluminum diisopropylate, (1-acetylcyclopentadienyl) cyclopentadienyl iron, chloroplatinic acid, platinum dibenzonitrile dichloride, platinum acetylacetonate, tetramethyl-tetravinyl cyclotetrasiloxane platinum complex, palladium acetate, palladium acetylacetonate, cyclopentadienylruthenium, titanium isopropoxide, and zirconium n-propoxide, for example). Aluminum complexes, in particular, have been found to be advantageous because of their low material costs and high reactivity, which is not adversely affected by the presence of other constituents (such as alcohols, for example). The fourth class of catalysts comprises non-halogen containing boron derivatives, such as boric acid and alkyl borates, including triisopropyl borate and tri-tert-butyl borate, for example.

In summary, curable resin systems of the present invention comprise combinations of an epoxy resin, an N-substituted aziridine, a catalyst or accelerator, and, optionally, a compound having active hydrogen. The functional group ratio of aziridine to epoxy is generally 1:2 or greater, and preferably in the range of 1:2 to 3:1 (aziridine:epoxy). The ratio of an optional active hydrogen compound to aziridine is generally in the range of from 0:1 to about 1:1. With respect to the total epoxy resin system, the portion of the catalyst (accelerator) is up to about 10% by weight for acid salts and complexes, electron accepting compounds, and non-halogen boron derivatives (i.e., the first, second, and fourth classes above), and up to about 5% by weight for metal complexes (i.e., the third class above), with the ratio of silicon hydride to metal complex at about 1:1 or greater. The epoxy resin systems of the present invention, including all combinations of the components described above, have utility as adhesives and coatings, particularly those using SCF $CO_2$ as a diluent to minimize or eliminate VOCs in spray application systems.

EXAMPLE 1

2-Methylaziridine (9.1 gm) was charged in a 100 ml round bottle reaction vessel equipped with a condenser and dropping funnel. Ethylene glycol diacrylate (13.5 gm) was slowly added to the solution while stirring with a magnetic stirrer to maintain the solution temperature below about 40°–45° C. The resulting solution was further stirred at 50° C. for 30 minutes and at room temperature for 30 minutes. Ethylene glycol di(2-methyl-1-aziridinepropionate) was formed as a slightly yellowish viscous liquid and used without further purification. Trimethylolpropane tris[3-(2-methyl-1-aziridinyl)propionate] was also prepared by adding trimeylolpropane triacrylate (9.87 gm) to 2-methylaziridine (5.7 gm) using the foregoing method.

EXAMPLE 2

A mixture of ethylene glycol di[3-(2-methyl-1-aziridinyl) propionate] (4.28 gm), bisphenol F epoxy (PY 306, Ciba Geigy) (2.48 gm), and triglycidyl aminophenol (MY 500, Ciba Geigy) (1.66 gm) was prepared in a glass beaker. This solution (1 gm) was added to $BF_3$-amine complex (Anchor 1222, Pacific Anchor Corp.) (30 mg) and allowed to stand at room temperature in an aluminum plate. The resin mixture formed a hard film within 24 hours. Without the Anchor 1222 catalyst ($BF_3$-amine complex), the resin showed no gelation after 7 days at room temperature.

EXAMPLE 3

PY 306 epoxy resin (4.8 gm) was treated with 2-methylaziridine (1.7 gm) by stirring overnight at room temperature to give an aziridine endcapped compound as a viscous liquid. The compound (1.1 gm) was mixed with PY 306 epoxy (0.7 gm) and MY 500 epoxy (0.5 gm) to make an epoxy-aziridine blend. The blend (1.0 gm) was mixed with Anchor 1222 $BF_3$-amine complex (30 mg) and allowed to stand at room temperature in an aluminum plate. The resin mixture formed a hard film within 24 hours. The resin without the Anchor 1222 catalyst required 4 days to solidify.

EXAMPLE 4

A mixture of PY 306 (0.5 gm) and bisphenol A (0.35 gm) was heated on a hot plate until homogenized and then cooled to room temperature. Trimethylolpropane tris[3-(2-methyl-1-aziridinyl)propionate] (0.5 gm) and Anchor 1222 (10 mg) were added to the mixture, and the resulting mixture was allowed to stand at room temperature. It gelled within 5 hours and produced a hard clear film after 24 hours.

EXAMPLE 5

A mixture of PY 306 (5 gm), trimethylolpropane tris[3-(2-methyl-1-aziridinyl)propionate] (5 gm), and nonylphenol (5 gm) was prepared. The effectiveness of cure was determined by adding different catalysts (45 mg) separately to the mixture (1.5 gm) in aluminum plates. The catalysts evaluated were Anchor 1222, cetyltrimethyl ammonium tosylate, and 1 ododecylpyridinium a p-toluene sulfate. The resulting mixtures were allowed to stand at room temperature and the gel times were determined. All samples, except one without catalysts (which required over 4 days to gel), solidified as clear films within 24 hours.

EXAMPLE 6

A mixture of PY 306 (5 gm), trimethylolpropane tris[3-(2-methyl-1-aziridinyl)propionate] (5 gm), and bisphenol A ethoxylale (2 EO/phenol) (Aldrich Chem.) (7.5 gm) was prepared. Catalysts were added to the mixture (2.5 gm) separately, and the effectiveness of cure was determined by allowing them to stand at room temperature. The catalysts evaluated were Anchor 1222, copper tosylate, trifluoromethylsulfonic acid tetraethylammonium salt, ferrocenesulfonic acid ammonium salt, cetyltrimethyl ammonium tosylate, 1-dodecylpyridinium p-toluene sulfate. All samples, except one without catalysts (which required over 6 days to gel), solidified as clear films within 24 hours.

EXAMPLE 7

Aluminum acetylacetonate (8 mg) and phenylsilane (0.04 ml) were added to a resin mixture of PY 306 (0.5 gm) and trimethylolpropane tris[3-(2-methyl-1-aziridinyl) propionate] (0.5 gm) in an aluminum plate. The resulting mixture produced a hard clear film after 24 hours at room temperature.

Example 8

Aluminum tri-tert-butoxide (8 mg) and phenylsilane (0.04 ml) were added to a resin mixture of PY 306 (0.5 gm) and trimethylolpropane tris[3-(2-methyl-1-aziridinyl) propionate] (0.5 gm) in an aluminum plate. The resulting mixture produced a hard clear film after 24 hours at room temperature.

EXAMPLE 9

Nonylphenol (0.15 gm) was added to a resin mixture of PY 306 (0.5 gm), trimethylolpropane tris[3-(2-methyl-1-aziridinyl)propionate] (0.5 gm), aluminum acetylacetonate (8 mg), and phenylsilane (0.04 ml) in an aluminum plate, and the resulting mixture was allowed to stand at room temperature. The mixture gelled within 10 hours and formed a hard clear film after 18 hours.

EXAMPLE 10

A catalyst system containing aluminum acetylacetate (8 mg), phenylsilane (0.04 ml), glycidyl phenyl ether (0.1 gm), and triethylamine (0.04 ml) was prepared and aged a few days before use. The catalyst was added to a resin containing PY 306 (0.5 gm), trimethylolpropane tris[3-(2-methyl-1-aziridinyl)propionate] (0.5 gm), and nonylphenol (0.15 gm) in an aluminum plate and allowed to stand at room temperature for 24 hours. The cured film was clear and hard.

EXAMPLE 11

A mixture of PY 306 (5.0 gm) and trimethylolpropane tris[3-(2-methyl-1-aziridinyl)propionate] (5.0 gm) was prepared. Seven samples were prepared by adding catalysts to the mixture separately (1.0 gm each) as follows: (i) platinic acid (1 mg)/phenylsilane (0.04 ml); (ii) platinic acid (1 mg)/phenylsilane (0.04 ml)/nonylphenol (0.2 gm); (iii) cyclopentadienyl ruthenium (1 mg)/phenylsilane (0.04 ml); and (iv) cobalt acetylacetate (2 mg)/phenylsilane (0.04 ml); (v) (1-acetylcyclopentadienyl)cyclopentadienyl iron (10 mg)/phenylsilane (0.03 ml); (vi) zirconium n-propoxide (20 mg)/phenylsilane (0.03 ml); and (vii) titanium isopropoxide (20 mg)/phenylsilane (0.03 ml). Tack free times at room temperature were 48 hours for samples (i) and (ii); 40 hours for samples (v), (vi) and (vii); 72 hours for sample (iii), and 7 days for sample (iv).

EXAMPLE 12

Boron butoxide (30 mg) was added to a resin mixture of PY 306 (0.5 gm) and trimethylolpropane tris[3-(2-methyl-1-aziridinyl)propionate] (0.5 gm) in an aluminum plate, and the resulting mixutre was allowed to stand at room temperature. The mixture provided a hard clear film within 20 hours.

EXAMPLE 13

Trimethylolpropane tris[3-(2-methyl-1-aziridinyl) propionate] (0.5 gm) was mixed with PY 306 (0.5 gm) and Anchor 1222 (30 mg), and $CO_2$ was subsequently bubbled through the mixture. There was no sudden increase in viscosity, as is commonly observed with conventional amines. A Fourier transform IR spectrum (FTIR) for the mixture after $CO_2$ exposure was the same as that before $CO_2$ exposure, indicating no adverse reaction products such as carbamic acid. The cured film was uniform and contained no voids.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

I claim:

1. A curable epoxy composition, comprising:
   an epoxy resin;
   a co-reactant selected from the group consisting of poly N-substituted aziridines, wherein the aziridine:epoxy ratio is in the range of 1:2 to 3:1;
   a catalyst to promote cure at ambient temperature, selected from the group consisting of salts and complexes of acids; electron accepting compounds; non-halogen containing boron derivatives; and combinations of a silicon hydride with a complex of a metal selected from the group consisting of Al, Fe, Pt, Pd, Rh, Ru, Ti, and Zr; and further comprising;
   supercritical fluid carbon dioxide as a diluent for spray application.

2. The curable epoxy composition of claim 1, wherein said epoxy resin is selected from the group consisting of bisphenol A epoxy, bisphenol F epoxy, novolac epoxy, cycloaliphatic epoxy, triglycidyl aminophenol, and triglycidyl isocyanurate.

3. The curable epoxy composition of claim 1, wherein said aziridine co-reactant is selected from the group consisting of:
   reaction products of an NH aziridine with a member of the group consisting of acrylates and methacrylates of trimethylolpropane, ethylene glycol, propylene glycol, bisphenol A, bisphenol F, pentaerythritol, glycerol, and their alkoxylated derivatives;
   reaction products of an NH aziridine with an epoxy compound; and
   reaction products of 1-aziridine ethanol with a member of the group consisting of epoxy and isocyanate functional compounds.

4. The curable epoxy composition of claim 1, wherein said acid salts and complexes are selected from the group consisting of $BF_3$-amine complexes, p-toluene sulfonic acid metal salts, cetyltrimethylammonium potoluene sulfonate, 1-dodecylpyridinium p-toluene sulfonate, tetraethylamine trifluorosulfonate, and ferrocenesulfonic acid ammonium salt.

5. The curable epoxy composition of claim 1, wherein said strong electron accepting compounds are selected from the group consisting of tetracyanobenzene and tetrachlorobenzoquinone.

6. The curable epoxy composition of claim 1, wherein said non-halogen containing boron derivatives are selected from the group consisting of boric acid and alkyl borates.

7. A curable epoxy composition, comprising:
   an epoxy resin;
   a co-reactant selected from the group consisting of poly N-substituted aziridines, wherein the aziridine:epoxy ratio is in the range of 1:2 to 3:1;
   a catalyst to promote cure at ambient temperature, selected from the group consisting of salts and complexes of acids; selection accepting compounds; non-halogen containing boron derivatives; and combinations of a silicon hydride with a complex of a metal selected from the group consisting of Al, Fe, Pt, Pd, Rh, Ru, Ti and Zr; and wherein said silicon hydride is selected from the group consisting of phenylsilane, diphenylsilane, and butysilane, and said metal complex is selected from the group consisting of aluminum acetylacetonate, aluminum trifluoroacetylacetate, 8-hydroxyquinolinol aluminum complex, aluminum isopropoxide, aluminum tri-tert-butoxide, aluminum tri-sec-butoxide, acetoakoxy aluminum diisopropylate, (1-acetylcyclopentadienyl)cyclopentadienyl iron, chloroplatinic acid, platinum dibenzonitrile dichloride, platinum acetylacetonate, tetramethyltetravinylcyclotetrasiloxane platinum complex, palladium acetate, palladium acetylacetonate, cyclopentadien-ylruthenium, titanium isopropoxide, and zirconium n-propoxide.

8. A curable epoxy composition, comprising:
   an epoxy resin selected from the group consisting of bisphenol A epoxy, bisphenol F epoxy, novolac epoxy, cycloaliphatic epoxy, triglycidyl-aminophenol, and triglycidyl isocyanurate;
   a co-reactant selected from the group of poly N-substituted aziridines, wherein the aziridine:epoxy ration is in the range of 1:2 to 3:1, said aziridines consisting of reaction products of an NH aziridine with a member of the group consisting of acrylates and methacrylates of trimethylolpropane ethylene glycol, propylene glycol, bisphenol A, bisphenol F, pentaerythritol, glycerol, and their alkoxylated derivatives; reaction products of an NH aziridine with an epoxy compound; and reaction products of 1-aziridine ethanol with a member of the group consisting of epoxy and isocyanate functional compounds;
   a catalyst, to promote cure at ambient temperature, selected from the group consisting of salts and complexes of acids, electron accepting compounds, non-halogen containing boron derivatives, and combinations of a silicon hydride with a complex of a metal selected from the group consisting of Al, Fe, Pt, Pd, Rh, Ru, Ti and Zr; and further comprising;
   supercritical fluid carbon dioxide as a diluent for spray application.

9. The curable epoxy composition of claim 8, wherein:
   said acid salts and complexes are selected from the group consisting of $BF_3$-amine complexes, p-toluene sulfonic acid metal salts, cetyltrimethylammonium p-toluene sulfonate, 1-dodecylpyridinium p-toluene sulfonate, tetraethylamine trifluorosulfonate, and ferrocenesulfonic acid ammonium salt;
   said electron accepting compounds are selected from the group consisting of tetracyanobenzene and tetrachlorobenzoquinone;
   said non-halogen containing boron derivatives are selected from the group consisting of boric acid, alkyl borates, triisopropyl borate, and tri-tert-butyl borate; and
   said silicon hydrides are selected from the group consisting of phenylsilane, diphenylsilane, and butylsilane.

10. The curable epoxy composition of claim 9, wherein said metal complexes are selected from the group consisting of aluminum acetylacetonate, aluminum trifluoroacetylacetate, 8-hydroxyquinolinol aluminum complex, aluminum isopropoxide, aluminum tri-tert-butoxide, aluminum tri-sec-butoxide, acetoalkoxy aluminum diisopropylate, (1-acetylcyclopentadienyl) cyclopentadienyl iron, chloroplatinic acid, platinum dibenzonitrile dichloride, platinum acetylacetonate, tetramethyl-tetravinyl cyclotetrasiloxane platinum complex, palladium acetate, palladium acetylacetonate, cyclopentadienylruthenium, titanium isopropoxide, and zirconium n-propoxide.

11. A curable epoxy composition, comprising:

an epoxy resin selected from the group consisting of bisphenol A epoxy, bisphenol F epoxy, novolac epoxy, cycloaliphatic epoxy, triglycidyl-aminophenol, and triglycidyl isocyanurate;

a co-reactant selected from the group of poly N-substituted aziridines, wherein the aziridine:epoxy ratio is in the range of 1:2 to 3:1, said aziridines consisting of:

Reaction products of an NH aziridine with a member of the group consisting of acrylates and methacrylates of trimethylolpropane, ethylene glycol, propylene glycol, bisphenol A, bisphenol F, pentaerythritol, glycerol, and their alkoxylated derivatives;

reaction products of an NH aziridine with an epoxy compound; and reaction products of 1-aziridine ethanol with the group consisting of epoxy and isocyanate functional compounds; and a catalyst, to promote cure at ambient temperature, selected from the group consisting of:

$BF_3$-amine complexes, p-toluene sulfonic acid metal salts, cetyltrimethylammonium p-toluene sulfonate, 1-dodecylpyridinum p-toluene sulfonate, tetraethylamine trifluorosulfonate, and ferrocenesulfonic acid ammonium salt;

tetracyanobenzene and tetrachlorobenzoquinone;

a non-halogen containing boron derivative selected from the group consisting of boric acid and alkyl borates;

combinations of a silicon hydride selected from the group consisting of phenylsilane, diphenylsilane, and butylsilane, with a metal complex selected from the group consisting of aluminum acetylacetonate, aluminum trifluoroacetylacetate, 8-hydroxyquinolinol aluminum complex, aluminum isopropoxide aluminum tri-tert-butoxide, aluminum tri-sec-butoxide, acetoalkoxy aluminum diisopropylate, (1-acetylcyclopentadienyl) cyclopentadienyl iron, chloroplatinic acid, platinum dibenzonitrile dichloride, platinum acetylacetonate, tetramethyl-tetravinylcyclotetrasiloxaneplatinum complex, palladium acetate, palladium acetylacetonate, cycopentrdienylruthenium, titanium isopropoxide, and zirconium n-propoxide, and further comprising;

supercritical fluid carbon dioxide as a diluent for spray application of the epoxy composition.

* * * * *